US011125073B2

(12) United States Patent
Ahmad et al.

(10) Patent No.: US 11,125,073 B2
(45) Date of Patent: Sep. 21, 2021

(54) HYBRID AXIAL AND RADIAL RECEIVER CONFIGURATIONS FOR ELECTROMAGNETIC RANGING SYSTEMS

(71) Applicant: Halliburton Energy Services, Inc., Houston, TX (US)

(72) Inventors: Akram Ahmadi Kalateh Ahmad, Bedford, MA (US); Ilker R. Capoglu, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/327,733

(22) PCT Filed: Jan. 27, 2017

(86) PCT No.: PCT/US2017/015392
§ 371 (c)(1),
(2) Date: Feb. 22, 2019

(87) PCT Pub. No.: WO2018/140038
PCT Pub. Date: Aug. 2, 2018

(65) Prior Publication Data
US 2020/0102818 A1 Apr. 2, 2020

(51) Int. Cl.
*G01V 3/34* (2006.01)
*E21B 47/0228* (2012.01)
(Continued)

(52) U.S. Cl.
CPC ........ *E21B 47/0228* (2020.05); *E21B 47/092* (2020.05); *G01V 3/30* (2013.01); *G01V 3/34* (2013.01)

(58) Field of Classification Search
CPC .. E21B 47/022; E21B 47/0228; E21B 47/092; G01V 3/30; G01V 3/34; G01V 3/18
See application file for complete search history.

(56) References Cited

U.S. PATENT DOCUMENTS 4,072,200 A * 2/1978 Morris ................ E21B 47/0228
175/45
4,185,238 A * 1/1980 Huchital ................. G01V 3/30
324/338
(Continued)

FOREIGN PATENT DOCUMENTS

WO 2014089402 6/2014
WO 2015047953 4/2015

OTHER PUBLICATIONS

ISRWO International Search Report and Written Opinion for PCT/US2017/015392 dated Oct. 24, 2017.
(Continued)

*Primary Examiner* — Patrick Assouad
*Assistant Examiner* — Demetrius R Pretlow
(74) *Attorney, Agent, or Firm* — Benjamin Ford; C. Tumey Law Group PLLC

(57) ABSTRACT

Systems and methods for active ranging-while-drilling (ARWD) for collision avoidance and/or well interception. A method for electromagnetic ranging of a target wellbore may comprise disposing a downhole measurement tool into a wellbore, wherein the downhole measurement tool may comprise receivers comprising at least one radially spaced pair of the receivers and at least one axially spaced pair of the receivers; performing field measurements with the receivers, where a first set of field measurements are from at least one radially spaced pair of the receivers, and a second set of field measurements are from at least one axially spaced pair of the receivers; and calculating at least one target well parameter of a target well from at least one of the first set of field measurements and the second set of field measurements.

27 Claims, 7 Drawing Sheets

(51) Int. Cl.
*G01V 3/30* (2006.01)
*E21B 47/092* (2012.01)

(56) References Cited

U.S. PATENT DOCUMENTS

| | | | | |
|---|---|---|---|---|
| 4,209,747 A * | 6/1980 | Huchital | | G01V 3/30 |
| | | | | 324/338 |
| 4,805,156 A * | 2/1989 | Attali | | E21B 47/005 |
| | | | | 367/35 |
| 4,933,640 A * | 6/1990 | Kuckes | | G01V 3/28 |
| | | | | 324/339 |
| 5,258,755 A * | 11/1993 | Kuckes | | E21B 47/0228 |
| | | | | 340/853.5 |
| 5,343,152 A * | 8/1994 | Kuckes | | E21B 47/0228 |
| | | | | 324/346 |
| 5,467,019 A * | 11/1995 | Lester | | G01V 3/28 |
| | | | | 324/239 |
| 5,485,089 A | 1/1996 | Kuckes | | |
| 5,589,775 A * | 12/1996 | Kuckes | | G01V 3/26 |
| | | | | 324/346 |
| 5,999,883 A * | 12/1999 | Gupta | | G01V 3/28 |
| | | | | 702/7 |
| 6,538,447 B2 * | 3/2003 | Bittar | | G01V 3/30 |
| | | | | 324/338 |
| 8,061,443 B2 * | 11/2011 | Hall | | E21B 47/00 |
| | | | | 175/50 |
| 8,072,221 B2 * | 12/2011 | Snyder, Jr. | | G01V 3/28 |
| | | | | 324/339 |
| 8,471,562 B2 * | 6/2013 | Knizhnik | | H01Q 1/04 |
| | | | | 324/346 |
| 8,810,247 B2 * | 8/2014 | Kuckes | | E21B 47/0228 |
| | | | | 324/346 |
| 8,838,389 B2 * | 9/2014 | Sinclair | | G01V 99/00 |
| | | | | 702/7 |
| 9,879,521 B2 | 1/2018 | Wu et al. | | |
| 10,145,231 B2 | 12/2018 | Donderici et al. | | |
| 10,358,910 B2 * | 7/2019 | Gritting | | E21B 47/024 |
| 2003/0105591 A1 * | 6/2003 | Hagiwara | | G01V 3/28 |
| | | | | 702/7 |
| 2004/0113626 A1 * | 6/2004 | Wang | | G01V 3/28 |
| | | | | 324/339 |
| 2010/0033187 A1 * | 2/2010 | Reiderman | | G01V 3/28 |
| | | | | 324/346 |
| 2011/0088890 A1 * | 4/2011 | Clark | | G01B 7/14 |
| | | | | 166/66.5 |
| 2011/0298462 A1 | 12/2011 | Clark et al. | | |
| 2011/0308794 A1 | 12/2011 | Bittar et al. | | |
| 2012/0013339 A1 * | 1/2012 | Kuckes | | E21B 47/0228 |
| | | | | 324/346 |
| 2012/0212229 A1 * | 8/2012 | Sinclair | | G01V 3/28 |
| | | | | 324/345 |
| 2013/0057287 A1 * | 3/2013 | Le | | E21B 47/092 |
| | | | | 324/346 |
| 2013/0144530 A1 * | 6/2013 | Bittar | | G01V 3/17 |
| | | | | 702/7 |
| 2013/0166215 A1 * | 6/2013 | Bittar | | G01V 3/38 |
| | | | | 702/11 |
| 2013/0226459 A1 | 8/2013 | Gorek | | |
| 2014/0111210 A1 * | 4/2014 | Fang | | G01V 3/28 |
| | | | | 324/346 |
| 2014/0121971 A1 * | 5/2014 | Hanak | | E21B 47/022 |
| | | | | 702/6 |
| 2014/0136115 A1 * | 5/2014 | Nikitenko | | G01V 3/28 |
| | | | | 702/7 |
| 2015/0034312 A1 | 2/2015 | McElhinney et al. | | |
| 2015/0212226 A1 * | 7/2015 | Smith | | G01V 3/28 |
| | | | | 324/339 |
| 2015/0219783 A1 | 8/2015 | Sitka | | |
| 2015/0268371 A1 | 9/2015 | Donderici et al. | | |
| 2015/0308260 A1 * | 10/2015 | Kuckes | | E21B 43/305 |
| | | | | 175/45 |
| 2015/0338542 A1 * | 11/2015 | Donderici | | G01V 3/26 |
| | | | | 702/7 |
| 2015/0361789 A1 * | 12/2015 | Donderici | | G01V 3/20 |
| | | | | 367/82 |
| 2016/0216396 A1 * | 7/2016 | Golla | | E21B 47/0228 |
| 2016/0216397 A1 * | 7/2016 | Donderici | | G01V 3/28 |
| 2016/0245072 A1 * | 8/2016 | Brooks | | E21B 47/0228 |
| 2016/0273340 A1 * | 9/2016 | Roberson | | E21B 7/04 |
| 2016/0273341 A1 | 9/2016 | Wu et al. | | |
| 2018/0003850 A1 * | 1/2018 | Jaaskelainen | | G01V 3/30 |
| 2019/0048702 A1 * | 2/2019 | Vorhoff | | E21B 7/06 |
| 2019/0178844 A1 * | 6/2019 | Lott | | G01R 33/0094 |
| 2019/0353031 A1 * | 11/2019 | Logan | | G01S 11/06 |

OTHER PUBLICATIONS

Halliburton, "Aurora Surface-Access Magnetic Ranging Service", H012729, Apr. 18, 2018.
M. Bittar, H. Wu and S. Li, "New Logging While Drilling Ranging Technique for SAGD: Theory and Experiment", SPE159405, Oct. 2012.
A.F. Kuckes, T. Lautzenhiser, A. G. Nekut and R. Sigal, "An Electromagnetic Survey Method for Directionally Drilling a Relief Well into a Blown Out Oil or Gas Well", SPE10946, Jun. 1984.
WellServ: Magnetic Guidance Tool, 2010.
B. Vandal, T. Grills, & G. Wilson, "A Comprehensive Comparison Between the Magnetic Guidance Tool and the Rotating Magnet Ranging Service", PETSOC-2004-176, Petroleum Society of Canada, Jun. 2004.
Wu, H.H., Hinke, S., & Fan, Y. "A New Well Positioning Technique: Access-Independent Ranging Solution for Providing Accurate Well Completion" SPE-187050-MS, 2017.
Halliburton, Solutions in Action: Pioneer Natural Resources Uses Active Magnetic Ranging to Avoid Risk of Wellbore Collision, 2008, available at https://www.halliburton.com/content/dam/ps/public/ss/contents/Case_Histories/web/H06436.pdf.
Oil & Gas Journal, "New Rotating Magnet Ranging Systems Useful in Oil Sands, DBM Developments" Feb. 23, 2004.

* cited by examiner

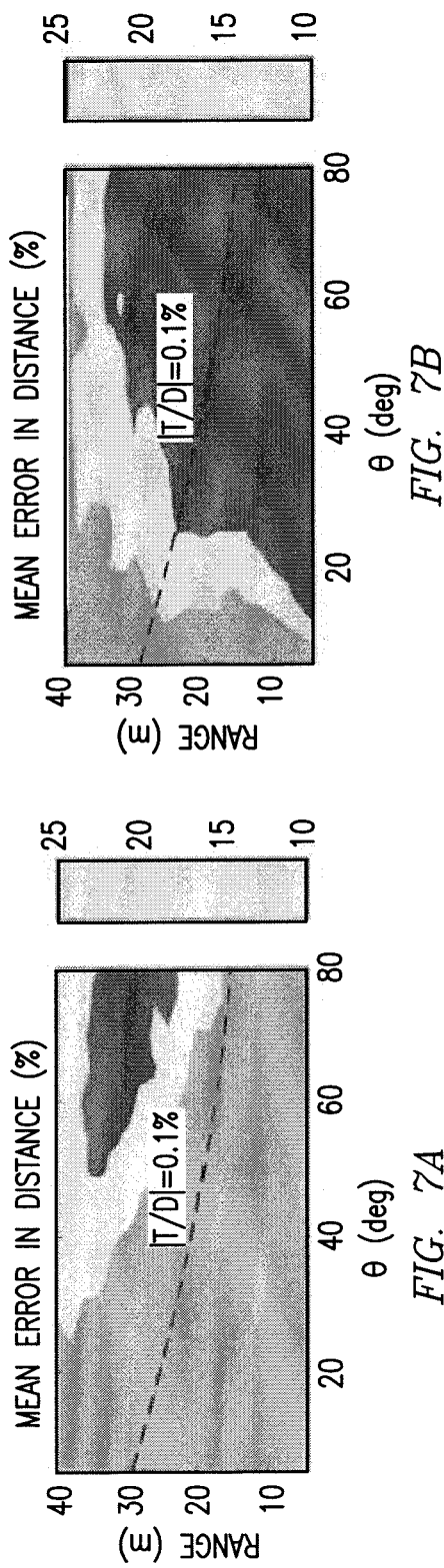
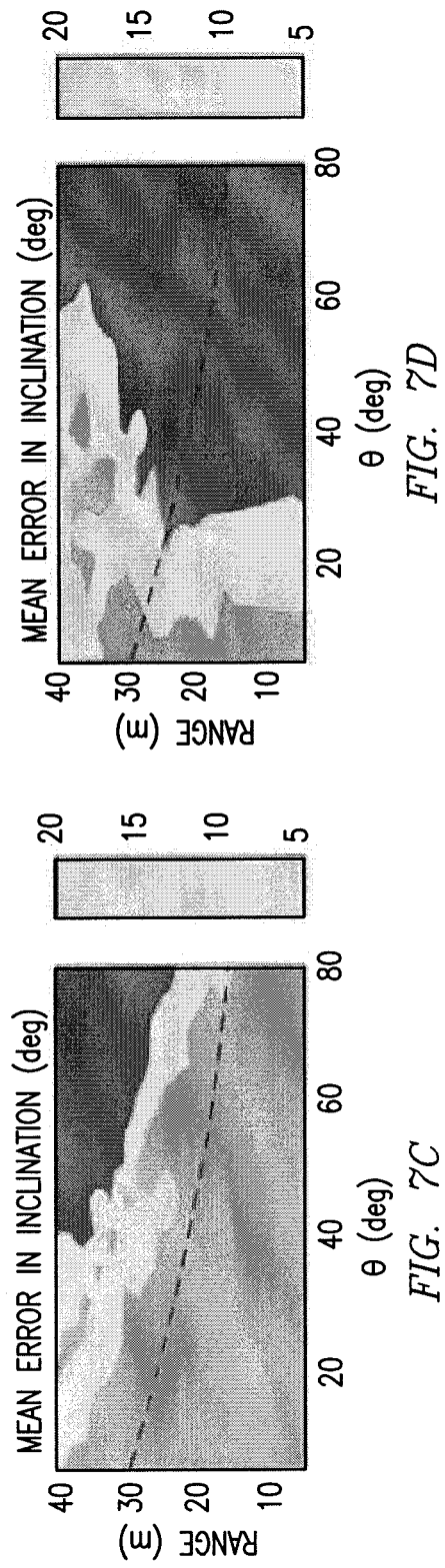

HYBRID AXIAL AND RADIAL RECEIVER CONFIGURATIONS FOR ELECTROMAGNETIC RANGING SYSTEMS

BACKGROUND

Wellbores drilled into subterranean formations may enable recovery of desirable fluids (e.g., hydrocarbons) using a number of different techniques. Knowing the location of a target wellbore may be important while drilling a second wellbore. For example, in the case of a target wellbore that may be blown out, the target wellbore may need to be intersected precisely by the second (or relief) wellbore in order to stop the blow out. Another application may be where a second wellbore may need to be drilled parallel to the target wellbore, for example, in a steam-assisted gravity drainage ("SAGD") operation, wherein the second wellbore may be an injection wellbore while the target wellbore may be a production wellbore. Yet another application may be where knowledge of the target wellbore's location may be needed to avoid collision during drilling of the second wellbore.

Downhole measurement tools may be employed in subterranean operations to determine direction and distance between two wellbores. Downhole measurement tools may use different techniques to obtain current on a conductive member in the target wellbore. Approaches may include directly injecting a current into the conductive member and/or inducing a current on a conductive member by transmitting electromagnetic fields by coil antennas positioned in a second wellbore. The induced current in turn may cause the casing to radiate a secondary electromagnetic field. In another approach, an electrode type source may be used to induce current on the conductive member. The gradient of the magnetic field radiated by the conductive member in addition to the magnetic field itself may be measured. Using a relationship between the magnetic field and its gradient, a ranging measurement may be calculated. Alternatively, an inversion may be used to determine the range, in which a forward model of the signal that may be received at the ranging tool may be needed. The inversion process may try to find the formation and well parameters that would match the forward model with the measurements made by the tool.

BRIEF DESCRIPTION OF THE DRAWINGS

These drawings illustrate certain aspects of some examples of the present disclosure, and should not be used to limit or define the disclosure.

FIGS. 7A-7D illustrates comparison of inversion errors due to additive random receiver noise.

DETAILED DESCRIPTION

Figure 1:
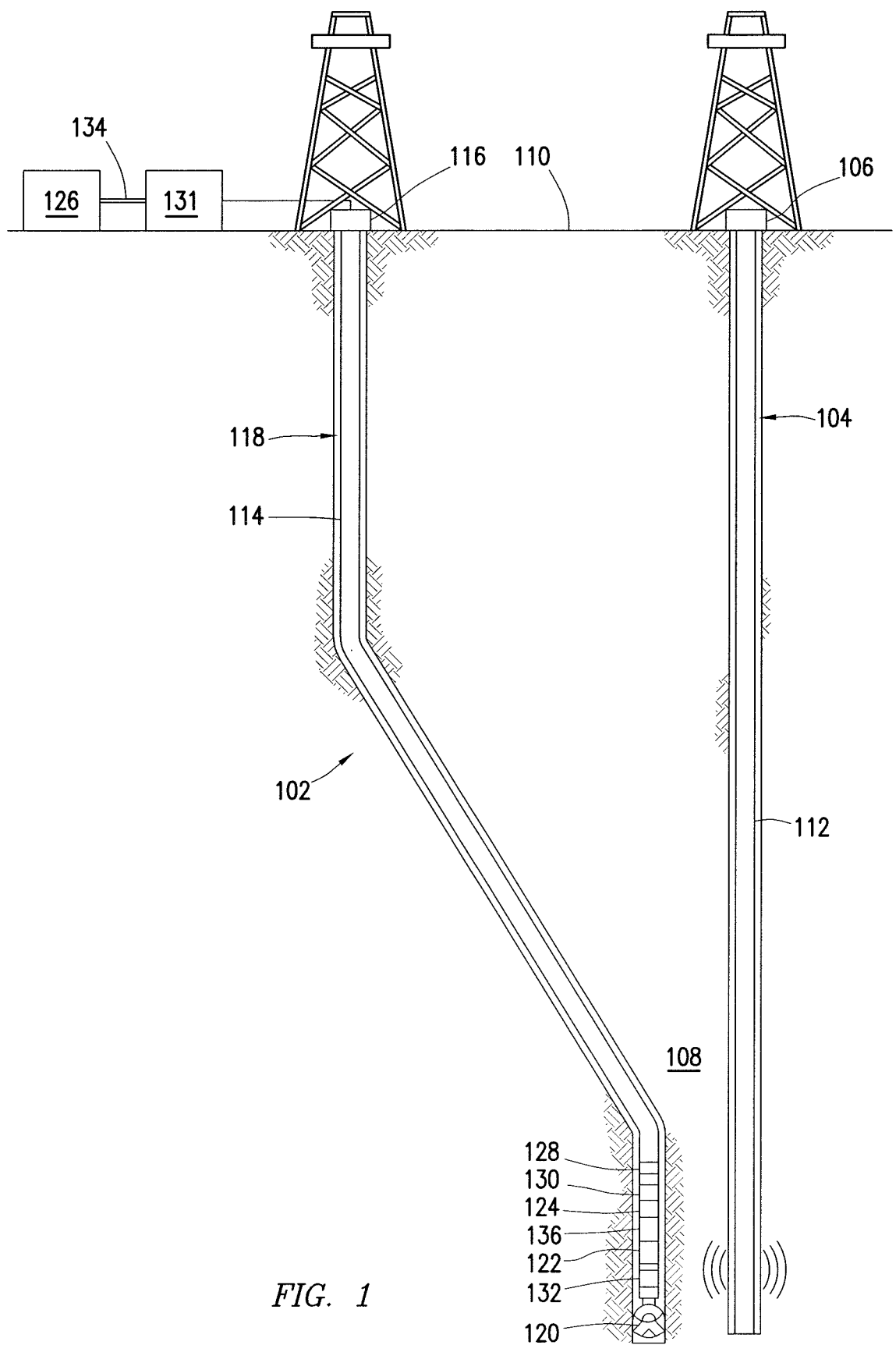
FIG. 1 is a schematic illustration of an example of an electromagnetic ranging system in a wellbore.

The present disclosure relates generally to a systems and methods for electromagnetic ranging. By way of example, this disclosure may relate to systems and methods for Active Ranging-While-Drilling (ARWD) for collision avoidance and/or well interception. This disclosure may relate to systems and methods for using a set of receivers arranged in radial and axial directions of a downhole measurement tool to calculate at least one target well parameter (e.g., the distance and direction) of a target well, which may be inaccessible. Additionally, the systems and methods may include ranging from very close to very far distances by using one single downhole measurement tool. Very close distances may include about 2 meters to about 60 meters, whereas vary far distances may include distances larger than 60 meters.

Determining the position and direction of a conductive pipe (such as a metallic casing) in a target well accurately and efficiently may be required in a variety of applications. One of these applications may be the case of a blow out well where the target well may be intersected very precisely by a relief well in order to stop the blowout. Another important application may be drilling a well parallel to a target well in SAGD applications for keeping a producer in an effective spot of the injector. Another application may include the need to detect one or more nearby target wells during drilling to avoid collision. These nearby target wells may not be accessible or any information about their position or structure may not be available. As a result, it may be of great importance to estimate one or more target well parameters, such as a relative position of the target wells, which may typically be characterized with a range, azimuth angle, elevation angle and target orientation.

In one method, a source may be located on a bottom hole assembly ("BHA") to excite a target well and then measure the magnetic field by the receivers which may also be located on the same BHA. In another method, coil antenna sources may be used to induce current on a nearby casing in the target well, and then the secondary magnetic field created by the induced current may be detected by receivers (e.g., magnetometer sensors or other coils) mounted on the BHA.

ARWD technologies for collision avoidance and/or well interception may require access to a target well, whether via a wireline-deployed intervention tool or surface excitation. The active source may be magnetic, electromagnetic or acoustic, with corresponding sensors in an adjacent well. However, in many drilling applications, access to the target well for excitation may not be possible. Thus, an electromagnetic ranging system capable of being deployed from a BHA that may measure data to calculate one or more target well parameters (e.g., a range and direction from the BHA to at least one target well), may be desired.

An electromagnetic ranging system may comprise a downhole measurement tool, which may comprise a transmitter and/or receiver. Transmission of electromagnetic fields by the transmitter and the recordation of signals by the receiver, may be controlled by an information handling system which may be located within a downhole measurement tool and/or corresponding surface equipment.

Systems and methods of the present disclosure may be implemented, at least in part, with an information handling system. An information handling system may include any instrumentality or aggregate of instrumentalities operable to compute, classify, process, estimate, transmit, receive, retrieve, originate, switch, store, display, manifest, detect, record, reproduce, handle, or utilize any form of information, intelligence, or data for business, scientific, control, or other purposes. An information handling system may include a control unit. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates an electromagnetic ranging system 102. As illustrated, a target wellbore 104 may extend from a first wellhead 106 into a subterranean formation 108 from a surface 110. Generally, target wellbore 104 may include horizontal, vertical, slanted, curved, and other types of wellbore geometries and orientations. Target wellbore 104 may be cased or uncased. A conductive member 112 may be disposed within target wellbore 104 and may comprise a metallic material that may be conductive and magnetic. By way of example, conductive member 112 may be a casing, liner, tubing, or other elongated steel tubular disposed in target wellbore 104. Determining one or more target well parameters (e.g., the position and direction of target wellbore 104) accurately and efficiently may be required in a variety of applications. For example, target wellbore 104 may be a "blowout" well. Target wellbore 104 may need to be intersected precisely by a second wellbore 114 in order to stop the "blowout." Alternatively, it may be desired to avoid collision with target wellbore 104 in drilling second wellbore 114 or it may be desired to drill the second wellbore 114 parallel to the target wellbore 104, for example, in SAGD applications. In examples, target wellbore 104 may not be accessible and/or information about the position and structure of target wellbore 104 may not be available. As will be discussed in more detail, electromagnetic ranging system 102 may be used for determining the location of target wellbore 104 with respect to second wellbore 114.

With continued reference to FIG. 1, second wellbore 114 may also extend from a second wellhead 116 that extends into subterranean formation 108 from surface 110. Generally, second wellbore 114 may include horizontal, vertical, slanted, curved, and other types of wellbore geometries and orientations. Additionally, while target wellbore 104 and second wellbore 114 are illustrated as being land-based, it should be understood that the present techniques may also be applicable in offshore applications. Second wellbore 114 may be cased or uncased. In examples, a conveyance 118 may begin at second wellhead 116 and traverse second wellbore 114. A drill bit 120 may be attached to a distal end of conveyance 118 and may be driven, for example, either by a downhole motor and/or via rotation of conveyance 118 from surface 110. Drill bit 120 may be a part of BHA 122 at distal end of conveyance 118. While not illustrated, BHA 122 may further comprise one or more of a mud motor, power module, steering module, telemetry subassembly, and/or other sensors and instrumentation as will be appreciated by those of ordinary skill in the art. BHA 122 may be a measurement-while drilling (MWD) or logging-while-drilling (LWD) system.

Electromagnetic ranging system 102 may comprise a downhole measurement tool 124. Downhole measurement tool 124 may be operatively coupled to conveyance 118 (e.g., wireline, slickline, coiled tubing, pipe, drill pipe, downhole tractor, or the like) which may provide electrical connectivity, as well as mechanical suspension, for downhole measurement tool 124.

Downhole measurement tool 124 may be a part of BHA 122. Downhole measurement tool 124 may be used for determining one or more target well parameters. Additionally, downhole measurement tool 124 may be connected to and/or controlled by information handling system 126, which may be disposed on surface 110 and/or on downhole measurement tool 124. In examples, information handling system 126 may communicate with downhole measurement tool 124 through a communication line (not illustrated) disposed in (or on) conveyance 118. In examples, wireless communication may be used to transmit information back and forth between information handling system 126 and downhole measurement tool 124. Information handling system 126 may transmit information to downhole measurement tool 124 and may receive as well as process information recorded by downhole measurement tool 124. In addition, downhole measurement tool 124 may include a downhole information handling system 128, which may also be disposed on BHA 122. Downhole information handling system 128 may include, a microprocessor or other suitable circuitry, for receiving and processing signals received by the downhole measurement tool 124. Downhole information handling system 128 may further include additional components, such as memory, input/output devices, interfaces, and the like. While not illustrated, the downhole measurement tool 124 may include one or more additional components, such as analog-to-digital converter, filter and amplifier, among others, that may be used to process the measurements of the downhole measurement tool 124 before they may be transmitted to surface 110. Alternatively, raw measurements from downhole measurement tool 124 may be transmitted to surface 110.

In examples, downhole measurement tool 124 may comprise a transmitter 130 and a set of radial receivers 132 arranged in radial directions and an axial receiver 136 arranged in an axial direction of downhole measurement tool 124. As disclosed herein, radial receivers 132 and axial receiver 136 may be used to perform field measurement for electromagnetic ranging. The radial receivers 132 may be separated radially in that the radial receivers 132 may be spaced perpendicular to the axis of BHA 122. The axial receiver 136 may be spaced axially in that the axial receiver 136 may be spaced axially (parallel to the axis of BHA 122) from one or more of the radially receiver 132 or an additional receiver. There may be a combination of a radially spaced pair or receivers, such as radial receivers 132, and an axially spaced pair of receivers. The axially spaced pair of receivers may include axial receiver 136 in combination with one or more of radial receivers 132 or an additional receiver.

Any of a variety of different transmitters 130, radial receivers 132, and axial receiver 136 for generating and/or measuring electromagnetic fields may be suitable for use, including, but not limited to, coil antenna, wire antenna, toroidal antenna and/or azimuthal button electrodes. Magnetometers may also be used as the radial receivers 132 and/or the axial receiver 136. Transmitter 130 may be energized, which may be controlled by information handling system 126 and/or downhole information handling system 128, to produce a magnetic field that may be emitted into subterranean formation 108. The magnetic field may energize conductive member 112 within target wellbore 104 by inducing eddy currents in conductive member 112. While FIG. 1 shows transmitter 130 on downhole measurement tool 124, transmitter 130 may be omitted and conductive member 112 may be energized using alternative techniques, such as by coupling a current source directly to conductive member 112 to generate currents. The currents within conductive member 112 may in turn produce a secondary magnetic field. This secondary magnetic field may radiate from target wellbore 104. The radial receivers 132 may be used to perform a first set of field measurements, The axial receiver 136 may be used to perform a second set of field measurements. Using at least one of the first set of field measurements or the second set of field measurements, one or more target well parameters of target wellbore 104 may be determined. By way of example, the direction and distance of target wellbore 104 may be determined with respect to second wellbore 114.

Any suitable technique may be used for transmitting signals from downhole measurement tool 124 to surface 110, including, but not limited to, wired pipe telemetry, mud-pulse telemetry, acoustic telemetry, and electromagnetic telemetry. While not illustrated, BHA 122 may include a telemetry subassembly that may transmit telemetry data to the surface. A transmitter in the telemetry subassembly may be operable to generate pressure pulses in the drilling fluid that propagate along the fluid stream to surface 110. At surface 110, pressure transducers (not shown) may convert the pressure signal into electrical signals for a digitizer 131. Digitizer 131 may supply a digital form of the telemetry signals to information handling system 126 via a communication link 134, which may be a wired or wireless link. The telemetry data may be analyzed and processed by information handling system 126. For example, the telemetry data could be processed to determine location of target wellbore 104. With the location of target wellbore 104, a driller may control the BHA 122 while drilling second wellbore 114 to intentionally intersect target wellbore 104, avoid target wellbore 104, and/or drill second wellbore 114 in a path parallel to target wellbore 104.

Figure 2:
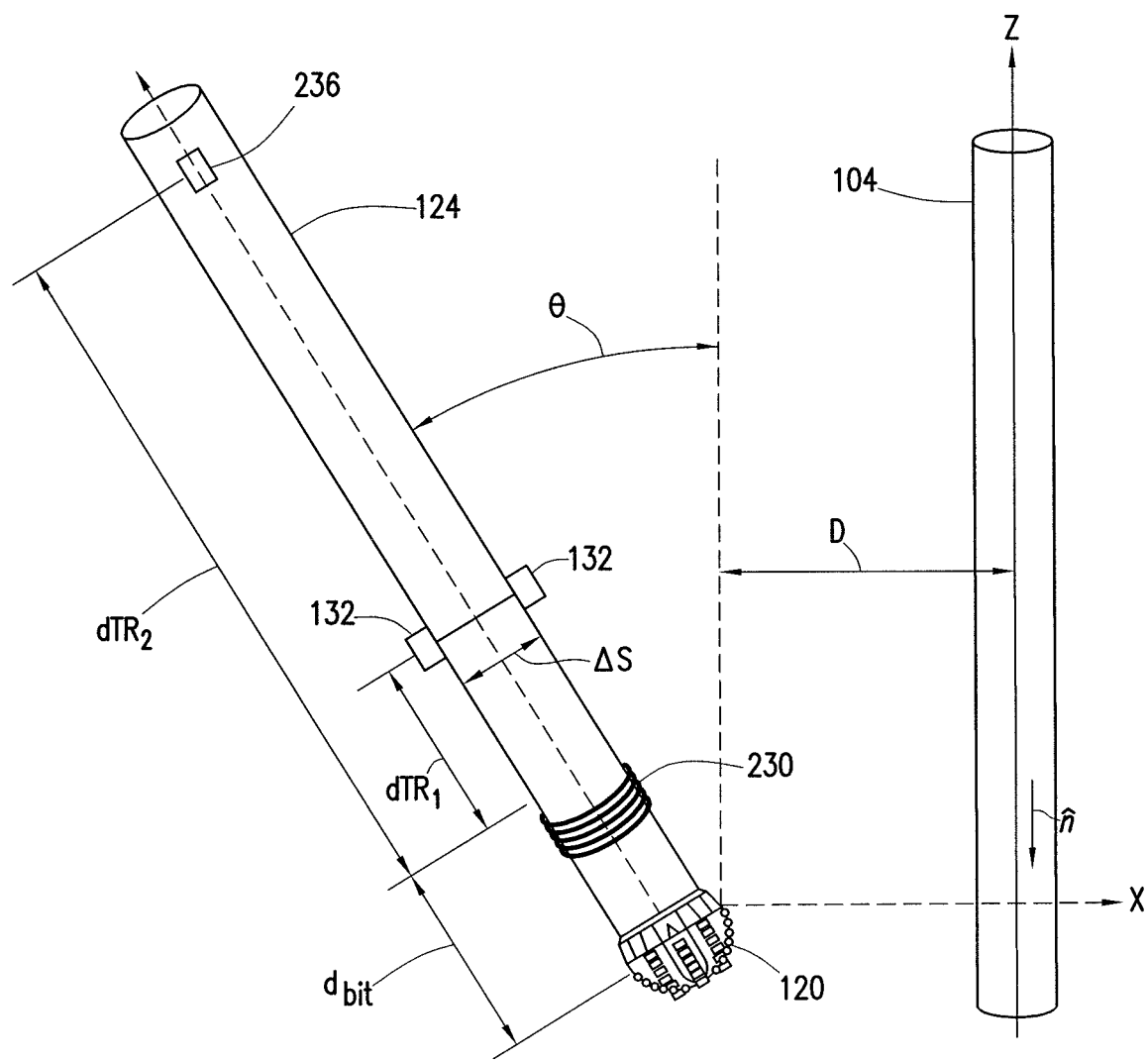
FIG. 2 is a schematic illustration an example of a set of radial receivers arranged in radial directions and an axial receiver arranged in an axial direction of a downhole measurement tool.

FIG. 2 illustrates a downhole measurement tool 124 that comprises a radially spaced pair of receivers, namely radial receivers 132 arranged in radial directions. Radial receivers 132 may have a radial spacing of $\Delta S$. Downhole measurement tool 124 also includes axial receiver 236 arranged in an axial direction of downhole measurement tool 224 and axially spaced from radial receivers 132. Axial receiver 136 may form an axially spaced pair of receivers with one or more of the radial receivers 132 or with one or more additional receivers. The radial receivers 132 and axial receiver 136 may be used to calculate the distance and direction to a conductive inaccessible well, such as, for example, target wellbore 104. This idea may necessitate a proper arrangement for transmitter 230, radial receivers 132, and axial receiver 236 and using a controller to switch between proper methods for distance calculation.

A cross section of a subterranean formation 108 and the target wellbore 104 and second wellbore 214 including the transmitter 230, radial receivers 132, and axial receiver 236 in the x-z plane is depicted. Transmitter 230 may include a transmitting tilted coil installed on the downhole measurement tool 224 at a distance $dTR_1$ from the radial receivers 132 and a distance $dTR_2$ from axial receiver 236 to excite current on the target wellbore 104. The inclination angle $\theta$ and the distance D between the target wellbore 104 and the drill bit 120 are also shown on FIG. 2. The distance between the drill bit 120 and the closest component (transmitter 230 and radial receivers 132/axial receiver 236) is also denoted by $d_{bit}$.

Wells may have metallic (such as steel) casings around them to fortify the well structure and prevent collapsing of the borehole wall. Since casing may be much more conductive than the formation around it, a strong coupling of the electric field to the target wellbore 104 may occur. This coupling of the electric field may produce a conduction current on the target wellbore 104. This current may then induce a magnetic field around target wellbore 104 whose magnitude may be detected by magnetic field sensors, such as, for example, radial receivers 132 and axial receiver 236.

Analysis of electromagnetic received data at radial receivers 132 and axial receiver 236 may provide target well parameters between the target wellbore 104 and the downhole measurement tool 224. In some systems and methods, an inversion algorithm based on the laws governing electromagnetic fields may be used to determine the position of transmitter 230 from radial receivers 132 and axial receiver 236. This inversion algorithm may be based on deterministic and/or stochastic numerical optimization in the form of minimization of a cost function. Cost function may be formed as the difference between the modeled measurements based on target well parameters and the downhole measurements. The distance D, inclination angle $\theta$, azimuth angle $\phi$, and target orientation $\hat{n}$ may be found, for example, if a sufficiently diverse set of field measurements is provided. For example, two field measurements may be sufficient to determine the distance D and the inclination angle $\theta$. There may be different configurations in which radial receivers 132, axial receiver 236, and transmitter 230 may be placed on the downhole measurement tool 224 to perform the measurement.

For a radial configuration, radial receivers 132 may be separated along the radial direction of the downhole measurement tool 224. Radial receivers 132 may be separated by a fixed distance $\Delta S$ along the radial direction in a single depth. Both of radial receivers 132 may perform field measurements and one of the radial receivers 132 may calculate the gradient field to calculate the distance D to the target wellbore 104.

A transmitting coil of transmitter 230 may produce an induced current on the target wellbore 104. This current may then induce a magnetic field around the target wellbore 104 whose magnitude may be found via the Biot-Savart law. If the induced current is constant, Biot-Savart law may reduce to Ampere's law and the magnetic field at a point may be given by equation (1) where $I_{eff}$ is an effective current on the target wellbore 104 and R is the radial distance from the target wellbore 104 to point r.

$$\vec{H}^i(\vec{r}) = \frac{I_{eff}}{2\pi r}\hat{\phi} \quad (1)$$

The gradient of the magnetic field at the same location, $$\frac{\partial \vec{H}^i(\vec{r})}{\partial r},$$

is given by equation (2).

$$\frac{\partial \vec{H}^i(\vec{r})}{\partial r} \approx \frac{I_{eff}}{2\pi r^2}\hat{\phi} \quad (2)$$

By taking the ratio of $$\vec{H}^i(\vec{r}) \text{ to } \frac{\partial \vec{H}^i(\vec{r})}{\partial r},$$

the radial distance to the target wellbore 104 may be determined as follows:

$$R = \left|\frac{\vec{H}^i(\vec{r})}{\frac{\partial \vec{H}^i(\vec{r})}{\partial r}}\right| \quad (3)$$

The current induced on the target wellbore 104 may be non-uniform, but if the downhole measurement tool 224 is close to the target wellbore 104 and the separation between radial receivers 132 is small (e.g., about 6 inches), the uniform current assumption may give accurate results.

For an axial configuration, sensors such as, for example, receivers 236 may be separated along the axial direction of the downhole measurement tool 124. The assumption that the induced current may be uniform along the target wellbore 104 may not be precise enough when downhole measurement tool 124 is at far distances from the target wellbore 104. For far distance ranging scenarios, more sophisticated inversion algorithms may be used instead of the gradient technique. To have a successful inversion, measurements may be as independent as possible and also provide an accurate signal-level difference between the two measurements to reduce ambiguity and linear dependency between them. To allow for this, the sensors may be at a sufficient distance from each other for an adequate signal gradient. To have a large distance between the sensors (radial receivers 132, axial receiver 236, etc.), one may position sensors along the downhole measurement tool 124 axis and set a desired distance between them. As illustrated, axial receiver 236 may be positioned at a desired distance from radial receivers 132. The signal data obtained from the downhole measurement tool 124 may be used in an inversion step to produce the target wellbore 104 parameters. In an inversion process, the measurement data may be matched to the signal data that comes from the system model. The distance D, inclination angle θ, azimuth angle φ and orientation n̂ may be found by the inversion process if a sufficiently diverse set of field measurements is provided. For example, if only D and θ are unknown, two field measurements may be sufficient for inversion. If φ is an unknown as well; multiple field measurements at different rotation angles may be used in the inversion to uniquely compute φ. In case n̂ vector (target orientation) is unknown, it may be found by using multiple depth information, multiple transmitter-receiver spacings or multiple channels with different tilt angles. In a hybrid radial/axial configuration, a combination of radial and axial pairs of sensors (e.g., radial receivers 132, axial receivers 236) may be used in downhole measurement tool 124. The radial pair sensors (e.g., radial receivers 132) may measure the magnetic field at a single depth and the data will be processed for distance calculation for close or parallel ranging and the axial pair sensors' (e.g., axial receiver 236 and one of radial receivers 132 or another sensor) data may be used for far distance ranging. At least one first target well parameter may be calculated based, at least partially, on the first set of field measurements; and at least one second target well parameter may be calculated based, at least partially, on a second set of field measurements. The step of calculating at least one target well parameter may use a weighted combination of the at least one first target well parameter and the at least one second target well parameter. Weights for the weighted combination based on the at least one second target well parameter may be determined. A threshold based on a distance or relative angle between the wellbore and the target wellbore 104 may be determined. The weighted combination may assign a value of 0 or 1 to a first weight for the at least one first target well parameter and a value of 0 or 1 to a second weight for the at least one second target well parameter. At least one radially spaced pair of the receivers comprise a first pair of radially spaced receivers 132 positioned on the downhole measurement tool 124 at the substantially same axial position and a second pair of radially spaced receivers 132 positioned on the downhole measurement tool 124 at a different azimuthal position than the first pair. At least one receiver of the radially spaced pair of the receivers 132 may be shared with the axially spaced pair of the receivers 136. At least one receiver of the at least one radially spaced pair of receivers 132 or the axially spaced pair of receivers 136 is oriented in a direction perpendicular to a longitudinal axis of the downhole measurement tool 124. The step of calculating at least one target well parameter of a target wellbore 104 may comprise applying an inversion technique to the second field measurements to provide a first calculated distance and a first calculated inclination angle to the target wellbore 104. The step of calculating at least one target well parameter of a target wellbore 104 may further comprise, applying a gradient technique to the first field measurements to determine a second calculated distance and a second calculated inclination angle to the target wellbore 104 if the first calculated distance and the first calculated inclination angle to the target wellbore 104 are less than respective thresholds. Deviations in path of the wellbore based, at least in part, on the at least one target wellbore 104 parameter, correcting a trajectory of a bottom hole assembly trajectory used in drilling the wellbore based, at least in part, on the determined deviations; and continuing drilling the wellbore with the BHA 122. The information handling system may be operable to calculate at least one target well parameter of a target wellbore 104 from at least one of first field measurements for the at least one radially spaced pair of receivers 132 or second field measurements for the at least one axially spaced pair of receivers 136. The information handling system may be configured to determine a deviation of a well path based, at least partially, on the at least one target well parameter. The information handling system may be operable to use a weighted combination of a first target well parameter from the at least one radially spaced pair of receivers 132 and a second target well parameter from the at least one axially spaced pair of receivers 136. The at least one radially spaced pair of receivers may comprise a first pair of radially spaced receivers 132 positioned on the downhole measurement tool 124 at the substantially same axial position and a second pair of radially spaced receivers 132 positioned on the downhole measurement tool 124 at a different axial position than the first pair, and wherein the at least one spaced axially pair of receivers 136 shares receivers with the first pair and the second pair. The at least one radially spaced pair of receivers 132 comprises a pair of radially spaced receivers 136 that are positioned at the substantially same axial position, wherein the at least one axially spaced pair of receivers 132 comprises a receiver axially spaced from the pair of radially spaced receivers 132 and one or more of the pair of radially spaced receivers 136. The at least one receiver of the at least one radially spaced pair of receivers 132 or the axially spaced pair of receivers 136 is oriented in a direction perpendicular to a longitudinal axis of the downhole measurement tool 124. The at least one receiver of the at least one radially spaced pair of receivers 132 or the axially spaced pair of receivers 136 comprises a coil antenna.

Figure 3A:
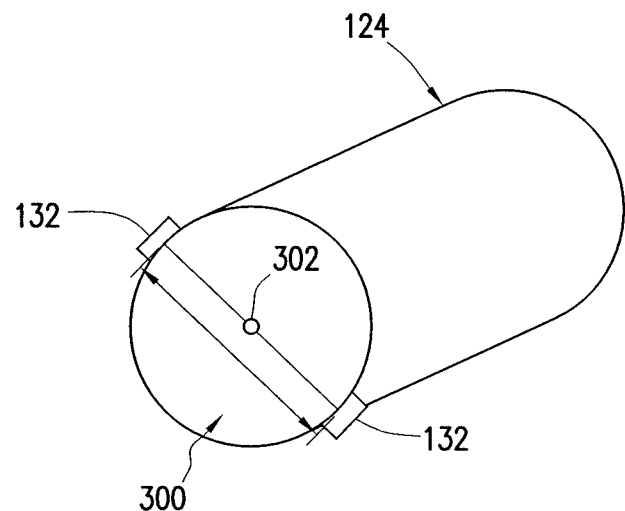
FIG. 3A is a schematic illustration of an example of a pair of receivers.
Figure 3B:
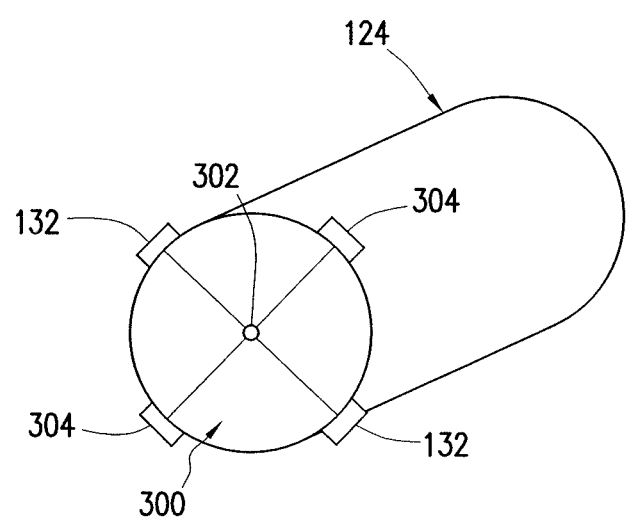
FIG. 3B is a schematic illustration of two pairs of receivers.
Figure 3C:
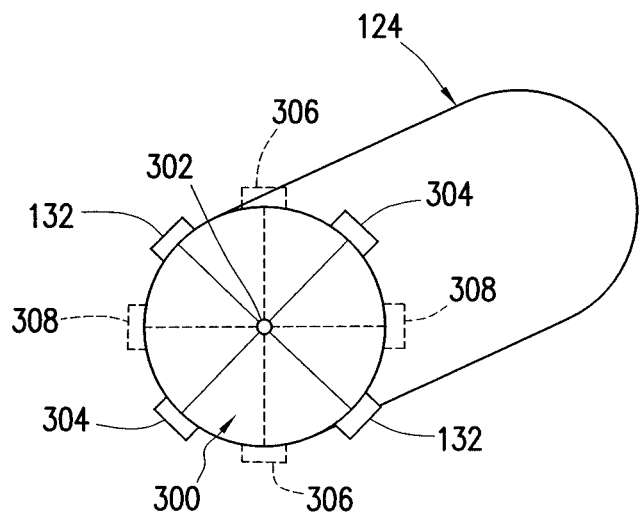
FIG. 3C is a schematic illustration of four pairs of receivers.

Referring now to FIG. 3A, radial receivers 132 are shown in more detail. As illustrated, radial receivers 132 may be separated along the radial direction of the tool face 300 of downhole measurement tool 124 with center 302. While drilling, the downhole measurement tool 124 may rotate and at certain azimuth angles between radial receivers 132 and the target wellbore 104, the radial receivers 132 may read identical fields and thereby, the gradient field calculation may be inaccurate. By way of example, these blind spots occur when only first pair of radial receivers 132 are used in the downhole measurement tool 124. To avoid the blind spots, rotate the downhole measurement tool 124 may be rotated to locate the first pair of radial receivers 132 at the proper azimuth angles and then perform field measurements or in a non-rotating scenario, a second pair of second radial receivers 404 may be used with radial receivers 132 at different downhole measurement tool 124 azimuth angles as illustrated for example in FIG. 3B, wherein downhole measurement tool 124 may comprise tool face 300 and center 302. When first pair of radial receivers 132 may be in a blind spot orientation, the second pair of second radial receivers 304 may not, and may perform the gradient measurement. By utilizing more radial sensors, the sensitivity and accuracy of the ranging measurement may be even more improved. FIG. 3C illustrates utilizing 8 sensors (e.g., first radial receivers 132, second radial receivers 304, third radial receivers 306, fourth radial receivers 308) located around the downhole measurement tool 124. Downhole measurement tool 124 may comprise tool face 300 and center 302.

Figure 4:
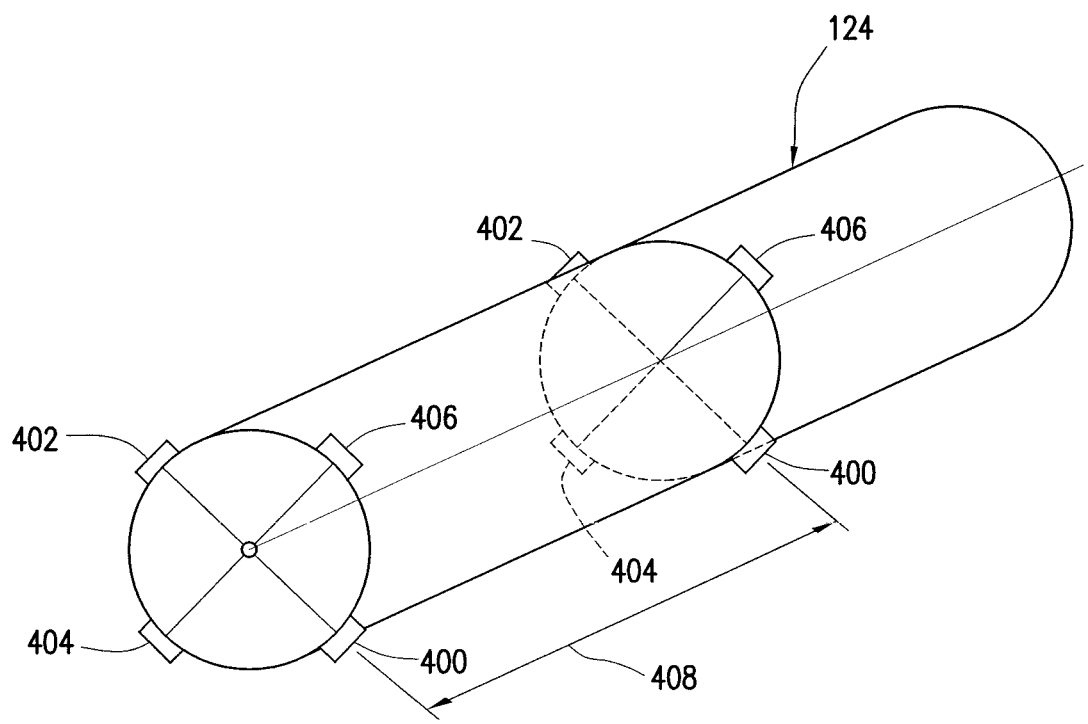
FIG. 4 is a schematic illustration of an example of a downhole measurement tool utilizing receivers in a hybrid radial-axial arrangement.

FIG. 4 illustrates a downhole measurement tool 124 utilizing sensors in a hybrid radial-axial arrangement. Four sets (sets of two) of receivers 400, 402, 404 and 406 may be located on the downhole measurement tool 124 by a distance 408 along the downhole measurement tool 124 axis. Each set may include a pair of receivers that may be separated along the radial direction of the downhole measurement tool 124. The data measured by axially separated receivers 400, 402, 404 and 406 may be used in an inversion process to calculate the distance and direction to the target wellbore 104 (shown in FIG. 1). The results may then go to a control unit. If the distance D and inclination angle θ are smaller than respective thresholds, then the control unit may set the downhole measurement tool 124 to perform gradient ranging calculations by using the radial receivers' data. The thresholds for D and θ to switch between axial and radial pairs may be determined by system modeling or lab measurements. Using both radial and axial pair configurations may provide a capability for ranging measurements from close to far distances, and for parallel and T-intersection ranging.

Figure 5:
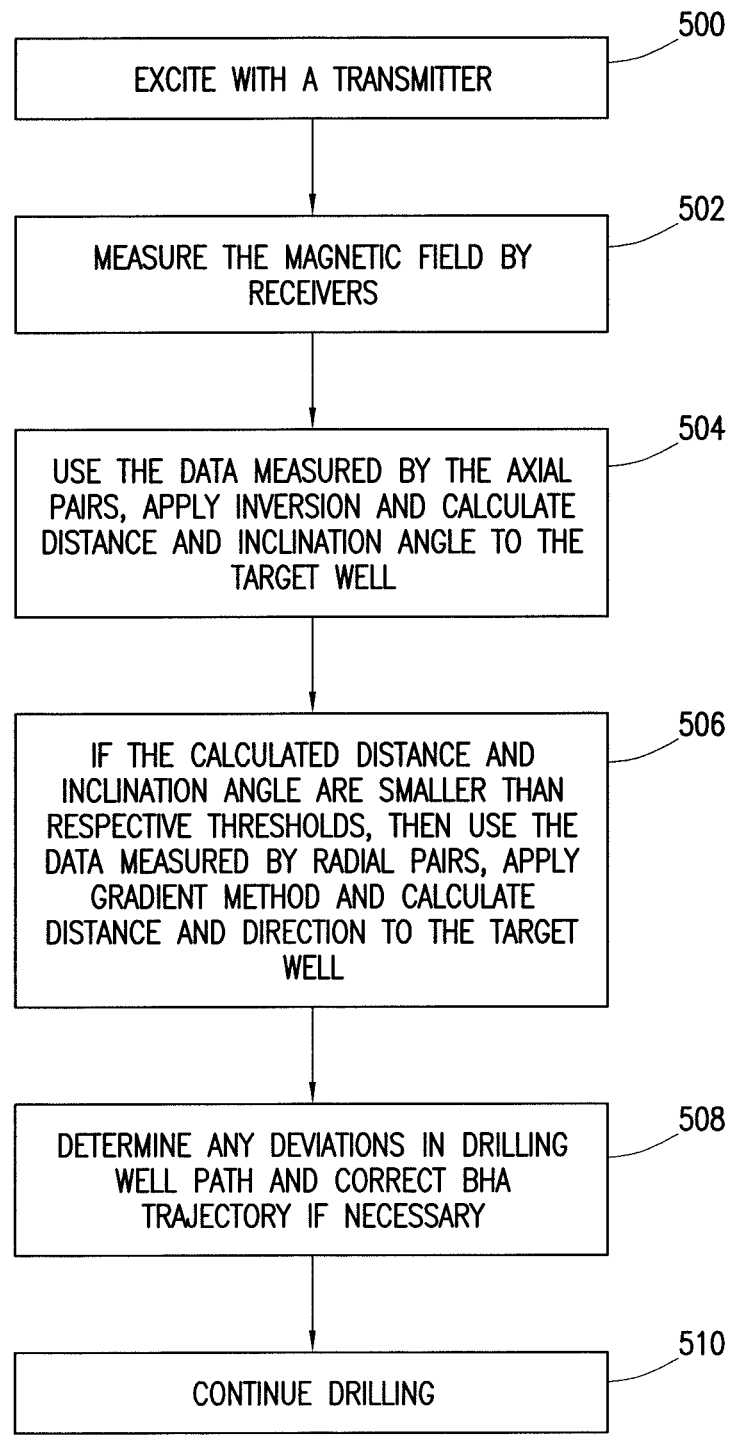
FIG. 5 illustrates an example of a work flow of a measurement process with radial and axial pairs for ranging calculations.

FIG. 5 illustrates a work flow of a measurement process with radial and axial pairs for ranging calculations. The distance D obtained from gradient measurement may be used to calibrate an axial measurement apparatus. D is the distance between the drill bit 120 and the target wellbore 104. When close to the target wellbore 104, the gradient formula may be accurate. Using the D value obtained from the gradient formula, the inversion algorithm of the axial pair(s) may be adjusted such that they give the same D value. Adjustable inversion parameters may vary (formation resistivity, inclination angle, initial guesses, etc.). Periodically calibrated this way at small distances, the axial pair(s) may perform better at larger distances where they are actually used. This calibration may improve the inversion accuracy of the axial setup at larger D values. Box 500 provides exciting with a transmitter (e.g., transmitter 130 shown in FIG. 1). Field measurements may be performed by the receivers (e.g., radial receivers 132, axial receiver 136), as shown in box 502. Box 504 provides that the field measurements by the axial pairs (e.g., receivers 236, shown in FIG. 2) may be used in an inversion calculation to calculate distance and inclination angle to the target wellbore 104 (shown in FIG. 1). Box 506 provides that if the calculated distance and inclination angle are smaller than respective thresholds, then the data measured by the radial pairs (radial receivers 132, shown in FIG. 2) may be used in a gradient method to calculate distance and direction to the target wellbore 104. Box 508 may provide determining any deviations in a drilling well path and correcting BHA trajectory if necessary. Box 510 provides that drilling may continue.

Features of this disclosure may include transmitters 130 and/or receivers 132 which may comprise coil antennas. There may be no necessity to have access to a target wellbore 104, thus, this method may be used for detecting metallic ghost wells in a field area which there may be no information about possible wells nearby. For close distance ranging, radially separated sensors may be used, and a gradient technique may provide for a fast and precise method to calculate distance and direction to a target wellbore 104. For far distance ranging, axially separated sensors may be used, and an inversion algorithm may be applied to calculate distance and direction to the target wellbore 104. Inversion may not be as fast and precise as the gradient method for close distance ranging, but it may provide a possibility of ranging for far distances in which a gradient method may not be applied. The disclosed techniques may be utilized in parallel to T-intersection scenarios. During drilling, the disclosed techniques may be utilized in logging while drilling ("LWD") ranging in SAGD oilfield operations and well interception. After drilling, the disclosed techniques may have direct relevance to production and reservoir monitoring.

A method for electromagnetic ranging of a target wellbore may comprise disposing a downhole measurement tool into a wellbore, wherein the downhole measurement tool may comprise receivers comprising at least one radially spaced pair of the receivers and at least one axially spaced pair of the receivers; performing field measurements with the receivers, where a first set of field measurements are from at least one radially spaced pair of the receivers, and a second set of field measurements are from at least one axially spaced pair of the receivers; and calculating at least one target well parameter of a target well from at least one of the first set of field measurements and the second set of field measurements. The method may further comprise calculating at least one first target well parameter based, at least partially, on the first set of field measurements; and calculating at least one second target well parameter based, at least partially, on the second set of field measurements. The step of calculating at least one target well parameter may use a weighted combination of the at least one first target well parameter and the at least one second target well parameter. The method may further comprise determining weights for the weighted combination based on the at least one second target well parameter. The method may further comprise determining a threshold based on a distance or relative angle between the wellbore and the target well. The weighted combination may assign a value of 0 or 1 to a first weight for the at least one first target well parameter and a value of 0 or 1 to a second weight for the at least one second target well parameter. The at least one radially spaced pair of the receivers may comprise a first pair of radially spaced receivers positioned on the downhole measurement tool at the substantially same axial position and a second pair of radially spaced receivers positioned on the downhole measurement tool at a different azimuthal position than the first pair. The at least one receiver of the radially spaced pair of the receivers may be shared with the axially spaced pair of the receivers. At least one receiver of the at least one radially spaced pair or the axially spaced pair may be oriented in a direction perpendicular to a longitudinal axis of the downhole measurement tool. The step of calculating at least one target well parameter of a target well may comprise applying an inversion technique to the second field measurements to provide a first calculated distance and a first calculated inclination angle to the target well. The step of calculating at least one target well parameter of a target well may further comprise, applying a gradient technique to the first field measurements to determine a second calculated distance and a second calculated inclination angle to the target well if the first calculated distance and the first calculated inclination angle to the target well are less than respective thresholds. The method may further comprise deviations in path of the wellbore based, at least in part, on the at least one target well parameter, correcting a trajectory of a BHA trajectory used in drilling the wellbore based, at least in part, on the determined deviations; and continuing drilling the wellbore with the BHA.

An electromagnetic ranging system may comprise at least one radially spaced pair of receivers; at least one axially spaced pair of receivers; and an information handling system, wherein the information handling system is configured to switch between the at least one radially spaced pair of receivers and the at least one axially spaced pair of receivers. The information handling system may be operable to calculate at least one target well parameter of a target well from at least one of first field measurements for the at least one radially spaced pair of receivers or second field measurements for the at least one axially spaced pair of receivers. The information handling system may be configured to determine a deviation of a well path based, at least partially, on the at least one target well parameter. The information handling system may be operable to use a weighted combination of a first target well parameter from the at least one radially spaced pair of receivers and a second target well parameter from the at least one axially spaced pair of receivers. The at least one radially spaced pair of receivers may comprise a first pair of radially spaced receivers positioned on the downhole measurement tool at the substantially same axial position and a second pair of radially spaced receivers that may be positioned on a downhole measurement tool at a different axial position than the first pair, and wherein the at least one spaced axially pair of receivers may share receivers with the first pair and the second pair. The at least one radially spaced pair of receivers may comprise a pair of radially spaced receivers that may be positioned at the substantially same axial position, wherein the at least one axially spaced pair of receivers may comprise a receiver axially spaced from the pair of radially spaced receivers and one or more of the pair of radially spaced receivers. At least one receiver of the at least one radially spaced pair or the axially spaced pair may be oriented in a direction perpendicular to a longitudinal axis of a downhole measurement tool. At least one receiver of the at least one radially spaced pair or the axially spaced pair may comprise a coil antenna.

To facilitate a better understanding of the present disclosure, the following examples of certain aspects of some of the systems, methods and cement compositions are given. In no way should the following examples be read to limit, or define, the entire scope of the disclosure.

Example 1

A modelled example of electromagnetic ranging with the gradient method for a radial configuration will now be described with respect to FIG. 2. Target wellbore 104 may be a thin hollow metal with the following properties: $\sigma=10^6$ S/m, $\varepsilon_r=1$, $\mu_r=60$, OD=8", and inner diameter ("ID")=7". The length of the target wellbore 104 may be assumed 2000 m. Transmitter 230 may be assumed to be located around the mid-point of the target wellbore 104 and in the form of a tilted coil with a tilt angle of 45°. The drill bit 120 may be located at a distance D from the target wellbore 104 as shown in FIG. 2. The transmitter 230 may have a coil diameter of 6.75" and may have N=120 turns. The transmitter 230 may be carrying current I=1 A at frequency of 10 Hz. The transmitters 230 or receivers (e.g., radial receivers 132, axial receiver 236), whichever is closer to the drill bit 120), may be at a 10 m distance ($d_{bit}$) from the drill bit 120. The subterranean formation 108 may be assumed to be homogeneous with resistivity ($R_f$) of 10 $\Omega \cdot$m, wherein $\varepsilon_{fr}=\mu_{fr}=1$. The radial receivers 132 may be located from transmitters 130 at a distance $dTR_1$ 100 ft with a radial separation $\Delta S$ of 6.75" along the radial direction of the downhole measurement tool 224.

Figure 6:
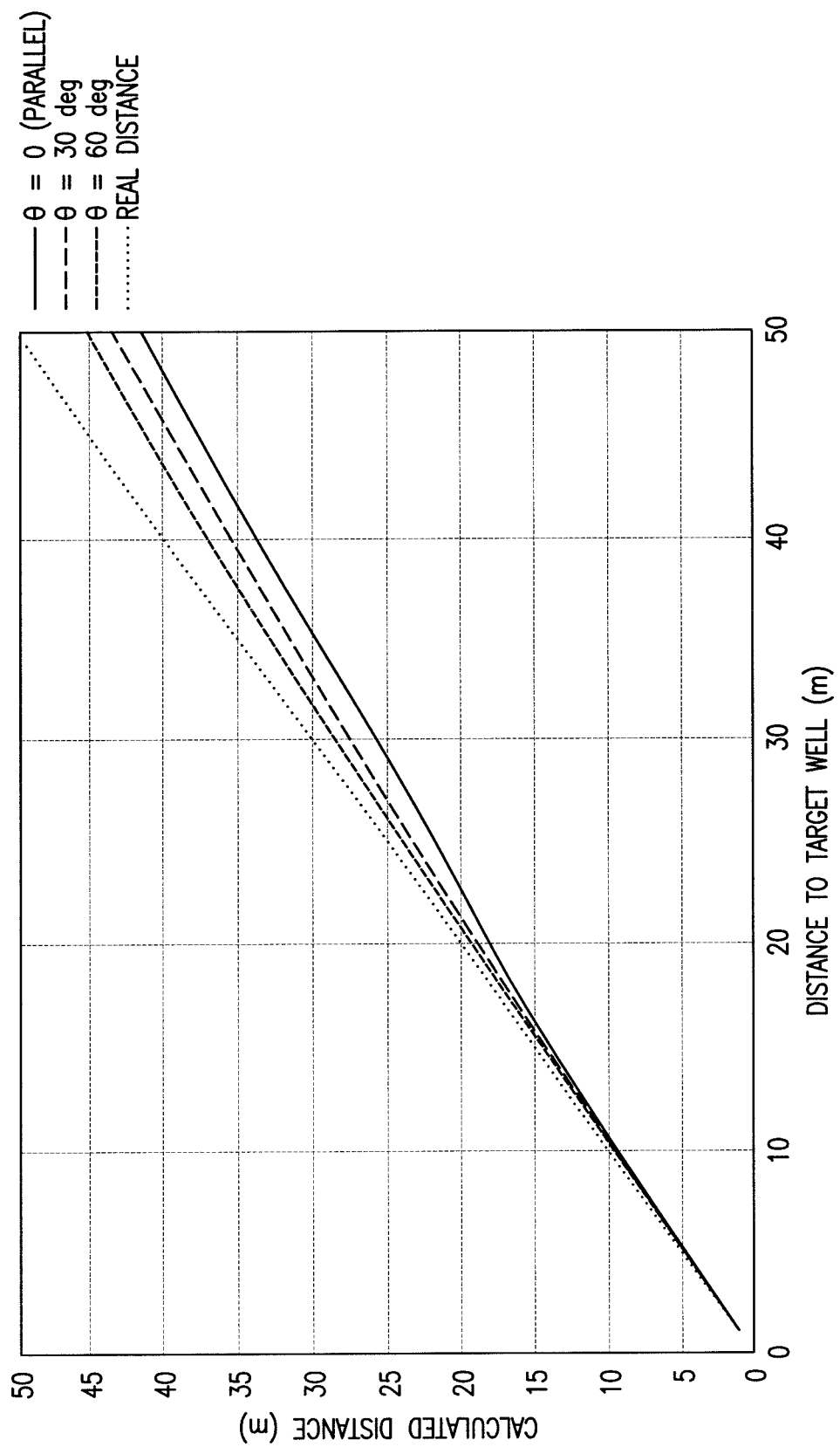
FIG. 6 illustrates an example of a distance calculated based on the gradient method using two data measured by two radially separated receivers.

FIG. 6 illustrates the calculated distance D to target wellbore 104 using the gradient method from field measurements of radial receivers 132 for this modelled example. As illustrated, the gradient method using radially spaced pairs may provide an accurate distance calculation for near distances. The gradient formula may also be more precise for smaller inclination angles (e.g., about 0° to about 30°), as the 60° inclination angle was the most inaccurate, indicating that the performance may degrade by going to a T-intersection. The accuracy of the constant current assumption may also degrade at higher operating frequencies. So, for high frequency operation, one may need to be in a close range to the target wellbore 104 (shown on FIG. 2), to be still able to use the gradient calculation.

Example 2

Another specific example of electromagnetic ranging with inversion will now be described with respect to FIG. 2. One consideration in the performance of an inversion algorithm may be its robustness against additive noise. Gaussian-distributed additive noise may be assumed to be present at axial receivers 136. It is assumed that this noise is zero-mean with standard deviation $\sigma_n$ is 5 nV. For this example, distance D and inclination angle $\theta$ are unknown and so two measurements may be needed for inversion. It may be assumed that the axially spaced pair may experience independent noise samples from the same distribution. The axially spaced pair may include axial receiver 136 and one of radial receivers 132. A Monte-Carlo analysis may be performed whereby 100 independent random noise pairs may be added to the axially spaced pair and the values for distance D/inclination angles $\theta$ computed via the inversion algorithm. For the sake of comparison, two sensor pairs at f=10 kHz ($R_f$=10 $\Omega$m) have been considered: 1) a radially spaced pair comprising radial receivers 132 with a radial separation $\Delta S$ of 6.75") and a $dTR_1$ of 37' from the transmitter 230; 2) the axially spaced pair with a $dTR_1$ of 37' and a $dTR_2$ of 91'. FIGS. 7a to 7d provide the modelled results for this example. (7A, 7C): Axially-separated coils at dTR1=37' and dTR2=91', (7B, 7D): Radially separated coils at dTR1=37' ($\Delta s$=6.75"). As illustrated, the superiority of the axially spaced pair may be evident for far distances. The radially spaced pair may offer acceptable error performance only at range of inclination angles $\theta$ from 0° to 10°. This may be due to the fact that the radial receivers 132 in the radially spaced pair may register almost the same signal close to a T-intersection.

The preceding description provides various examples of the systems and methods of use disclosed herein which may contain different method steps and alternative combinations of components. It should be understood that, although individual examples may be discussed herein, the present disclosure covers all combinations of the disclosed examples, including, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for electromagnetic ranging of a target wellbore, comprising:
   disposing a downhole measurement tool into a wellbore, wherein the downhole measurement tool comprises receivers comprising at least one radially spaced pair of the receivers and at least one axially spaced pair of the receivers;
   performing field measurements with the receivers; where a first set of field measurements are from at least one radially spaced pair of the receivers, and a second set of field measurements are from at least one axially spaced pair of the receivers;
   calculating an inclination angle between the downhole measurement tool and a z-axis of a target well from the first set of field measurements and the second set of field measurements, wherein the z axis is a longitudinal axis of the target well; and
   calculating a range from the downhole measurement tool to the target well from the first set of field measurements and the second set of field measurements.

2. The method of claim 1, further comprising calculating at least one first target well parameter based, at least partially, on the first set of field measurements; and calculating at least one second target well parameter based, at least partially, on the second set of field measurements.

3. The method of claim 2, wherein the at least one first target well parameter is calculated based on the first set of field measurements; and the at least one second target well parameter is based on the second set of field measurements.

4. The method of claim 2, wherein the calculating at least one target well parameter uses a weighted combination of the at least one first target well parameter and the at least one second target well parameter.

5. The method of claim 4, further comprising determining weights for the weighted combination based on the at least one second target well parameter.

6. The method of claim 5, further comprising determining a threshold based on a distance or relative angle between the wellbore and the target wellbore.

7. The method of claim 4, wherein the weighted combination assigns a value of O or 1 to a first weight for the at least one first target well parameter and a value of O or 1 to a second weight for the at least one second target well parameter.

8. The method of claim 1, wherein the at least one radially spaced pair of the receivers comprise a first pair of radially spaced receivers positioned on the downhole measurement tool at a substantially same axial position and a second pair of radially spaced receivers positioned on the downhole measurement tool at a different azimuthal position than the first pair.

9. The method of claim 1, wherein at least one receiver of the radially spaced pair of the receivers is shared with the axially spaced pair of the receivers.

10. The method of claim 1, wherein at least one receiver of the at least one radially spaced pair or the axially spaced pair is oriented in a direction perpendicular to a longitudinal axis of the downhole measurement tool.

11. The method of claim 1, wherein the calculating at least one target well parameter of a target well comprises applying an inversion technique to the second set of field measurements to provide a first calculated distance and a first calculated inclination angle to the target well.

12. The method of claim 11, wherein the calculating at least one target well parameter of a target well further comprises, applying a gradient technique to the first set of field measurements to determine a second calculated distance and a second calculated inclination angle to the target well if the first calculated distance and the first calculated inclination angle to the target well are less than respective thresholds.

13. The method of claim 1, further comprising determining deviations in path of the wellbore based, at least in pail, on the at least one target well parameter, correcting a trajectory of a bottom hole assembly trajectory used in drilling the well bore based, at least in part, on the determined deviations; and continuing drilling the wellbore with the bottom hole assembly.

14. An electromagnetic ranging system comprising:
at least one radially spaced pair of receivers configured to take a first set of field measurements and disposed on a downhole measurement tool;
at least one axially spaced pair of receivers configured to take a second set of field measurements disposed on the downhole measurement tool; and
an information handling system, wherein the information handling system is configured to switch between the at least one radially spaced pair of receivers and the at least one axially spaced pair of receivers, calculate an inclination between the downhole measurement tool and a z-axis of a target well from the first set of field measurements and the second set of field measurements, and calculate a range from the downhole measurement tool to the target well from the first set of field measurements or the second set of field measurements, wherein the z axis is a longitudinal axis of the target well.

15. The electromagnetic ranging system of claim 14, wherein the information handling system is operable to calculate at least one target well parameter of a target well from at least one of the first set of field measurements or the second set of field measurements.

16. The electromagnetic ranging system of claim 15, wherein the information handling system is configured to determine a deviation of a well path based, at least partially, on the at least one target well parameter.

17. The electromagnetic ranging system of claim 15, wherein the information handling system is operable to use a weighted combination of a first target well parameter from the at least one radially space d pair of receivers and a second target well parameter from the at least one axially spaced pair of receivers.

18. The electromagnetic ranging system of claim 14, wherein the at least one radially spaced pair of receivers comprise a first pair of radially spaced receivers positioned on a downhole measurement tool at a substantially same axial position and a second pair of radially spaced receivers positioned on the downhole measurement tool at a different axial position than the first pair, and wherein the at least one spaced axially pair of receivers shares receivers with the first pair of radially spaced receivers and the second pair of radially spaced receivers.

19. The electromagnetic ranging system of claim 14, wherein the at least one radially spaced pair of receivers comprises a pair of radially spaced receivers that are positioned at a substantially same axial position, wherein the at least one axially spaced pair of receivers comprises a receiver axially spaced from the pair of radially spaced receivers and one or more of the pair of radially spaced receivers.

20. The electromagnetic ranging system of claim 14, wherein at least one receiver of the at least one radially spaced pair of receivers or the axially spaced pair of receivers is oriented in a direction perpendicular to a longitudinal axis of a downhole measurement tool.

21. A method for electromagnetic ranging of a target wellbore, comprising:
disposing a downhole measurement tool into a wellbore, wherein the downhole measurement tool comprises receivers comprising at least one radially spaced pair of the receivers and at least one axially spaced pair of the receivers;
performing field measurements with the receivers, where a first set of field measurements are from at least one radially spaced pair of the receivers, and a second set of field measurements are from at least one axially spaced pair of the receivers;
calculating at least an inclination angle one target well parameter of a target well from at least one of the first set of field measurements and the second set of field measurements; and
calculating at least one first target well parameter based, at least partially, on the first set of field measurements; and
calculating at least one second target well parameter based, at least partially, on the second set of field measurements, wherein the calculating at least one target well parameter uses a weighted combination of the at least one first target well parameter and the at least one second target well parameter.

22. A method for electromagnetic ranging of a target wellbore, comprising:
disposing a downhole measurement tool into a wellbore, wherein the downhole measurement tool comprises receivers comprising at least one radially spaced pair of the receivers and at least one axially spaced pair of the receivers;
performing field measurements with the receivers, where a first set of field measurements are from at least one radially spaced pair of the receivers, and a second set of field measurements are from at least one axially spaced pair of the receivers; and calculating at least one target well parameter of a target well from at least one of the first set of field measurements and the second set of field measurements;

calculating at least one first target well parameter based, at least partially, on the first set of field measurements;

calculating at least one second target well parameter based, at least partially, on the second set of field measurements, wherein the calculating at least one target well parameter uses a weighted combination of the at least one first target well parameter and the at least one second target well parameter; and determining weights for the weighted combination based on the at least one second target well parameter.

23. A method for electromagnetic ranging of a target wellbore, comprising:

disposing a downhole measurement tool into a wellbore, wherein the downhole measurement tool comprises receivers comprising at least one radially spaced pair of the receivers and at least one axially spaced pair of the receivers;

performing field measurements with the receivers, where a first set of field measurements are from at least one radially spaced pair of the receivers, and a second set of field measurements are from at least one axially spaced pair of the receivers; and calculating at least one target well parameter of a target well from at least one of the first set of field measurements and the second set of field measurements;

calculating at least one first target well parameter based, at least partially, on the first set of field measurements;

calculating at least one second target well parameter based, at least partially, on the second set of field measurements, wherein the calculating at least one target well parameter uses a weighted combination of the at least one first target well parameter and the at least one second target well parameter;

determining weights for the weighted combination based on the at least one second target well parameter; and determining a threshold based on a distance or relative angle between the wellbore and the target wellbore.

24. A method for electromagnetic ranging of a target wellbore, comprising:

disposing a downhole measurement tool into a wellbore, wherein the downhole measurement tool comprises receivers comprising at least one radially spaced pair of the receivers and at least one axially spaced pair of the receivers;

performing field measurements with the receivers, where a first set of field measurements are from at least one radially spaced pair of the receivers, and a second set of field measurements are from at least one axially spaced pair of the receivers;

calculating at least an inclination angle one target well parameter of a target well from at least one of the first set of field measurements and the second set of field measurements; and calculating at least one first target well parameter based, at least partially, on the first set of field measurements; and calculating at least one second target well parameter based, at least partially, on the second set of field measurements, wherein the calculating at least one target well parameter uses a weighted combination of the at least one first target well parameter and the at least one second target well parameter, and wherein the weighted combination assigns a value of O or 1 to a first weight for the at least one first target well parameter and a value of O or 1 to a second weight for the at least one second target well parameter.

25. A method for electromagnetic ranging of a target wellbore, comprising:

disposing a downhole measurement tool into a wellbore, wherein the downhole measurement tool comprises receivers comprising at least one radially spaced pair of the receivers and at least one axially spaced pair of the receivers;

performing field measurements with the receivers, where a first set of field measurements are from at least one radially spaced pair of the receivers, and a second set of field measurements are from at least one axially spaced pair of the receivers; and calculating at least one target well parameter of a target well from at least one of the first set of field measurements and the second set of field measurements, wherein the calculating at least one target well parameter of a target well comprises applying an inversion technique to the second set of field measurements to provide a first calculated distance and a first calculated inclination angle to the target well.

26. A method for electromagnetic ranging of a target comprising:

disposing a downhole measurement tool into a wellbore, wherein the downhole measurement tool comprises receivers comprising at least one radially spaced pair of the receivers and at least one axially spaced pair of the receivers;

performing field measurements with the receivers, where a first set of field measurements are from at least one radially spaced pair of the receivers, and a second set of field measurements are from at least one axially spaced pair of the receivers;

calculating at least one target well parameter of a target well from at least one of the first set of field measurements and the second set of field measurements, wherein the calculating at least one target well parameter of a target well comprises applying an inversion technique to the second set of field measurements to provide a first calculated distance and a first calculated inclination angle to the target well; and applying a gradient technique to the first set of field measurements to determine a second calculated distance and a second calculated inclination angle to the target well if the first calculated distance and the first calculated inclination angle to the target well are less than respective thresholds.

27. An electromagnetic ranging system comprising:

at least one radially spaced pair of receivers;

at least one axially spaced pair of receivers; and an information handling system, wherein the information handling system is configured to switch between the at least one radially spaced pair of receivers and the at least one axially spaced pair of receivers, determine a deviation of a well path based, at least partially, on the at least one target well parameter, and operable to use a weighted combination of a first target well parameter from the at least one radially spaced pair of receivers and a second target well parameter from the at least one axially spaced pair of receivers.

* * * * *